Oct. 10, 1939. H. WOJTKOWIAK Re. 21,233
GASEOUS ELECTRIC DISCHARGE SYSTEM
Original Filed Jan. 7, 1936
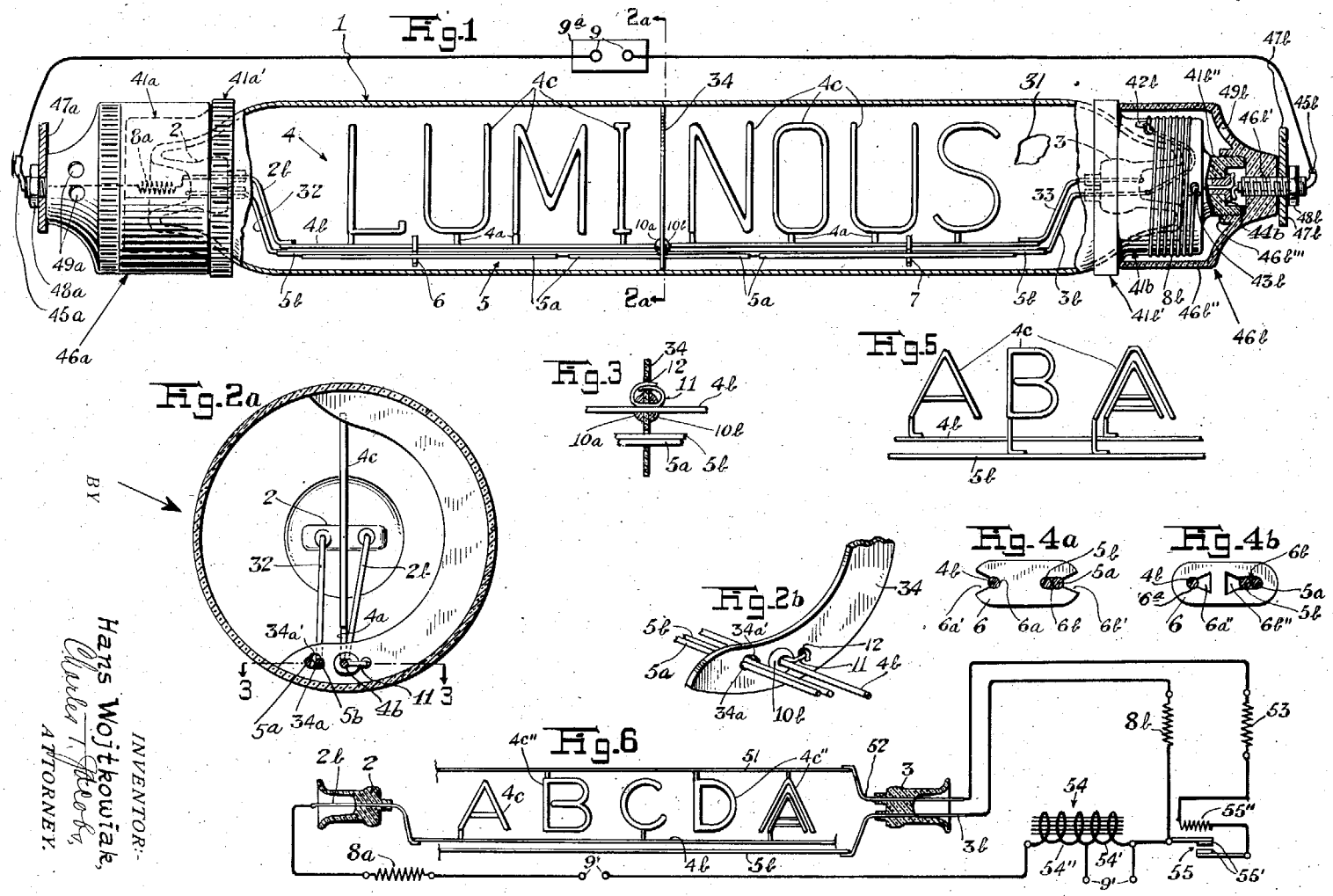
BY
INVENTOR:-
Hans Wojtkowiak,
Charles T. Jacobs,
ATTORNEY.

Reissued Oct. 10, 1939

Re. 21,233

UNITED STATES PATENT OFFICE 21,233

GASEOUS ELECTRIC DISCHARGE SYSTEM

Hans Wojtkowiak, Lansdale, Pa., assignor to Luminor Electric Company, Union City, N. J., a corporation of New Jersey Original No. 2,118,000, dated May 17, 1938, Serial No. 57,885, January 7, 1936. Application for reissue May 16, 1939, Serial No. 274,075

20 Claims. (Cl. 176—124)

This invention relates to gaseous electric discharge systems, and in its more important aspects to a system wherein glow-light is produced about the electrodes of a discharge device. A particular form of device with which the invention is concerned is one including electrode means in the form of letters or other indicia—for example, entire words, about which the glow-light is maintained to produce the effect of glow of the indicia themselves.

This application is filed in substitution for my co-pending application Serial No. 57,885, filed January 7, 1936, and herewith abandoned.

It is an object of my invention to provide a device and system of the class described which will produce bright glow-light about the electrodes without distracting light in the positive column between the electrodes.

It is another object to provide such a system and device satisfactorily operable with reasonable supply voltages.

It is another object to maintain the glow-light essentially uniform over the entire indicia surface.

It is a very important object to minimize electrode disintegration in such a device, particularly without impeding the fulfilment of other objects of the invention.

It is another object of my invention to provide such a device wherein electrode means, distributed in the form of entire words or the like, are arranged in an improved manner to provide uniform glow-light, and at the same time unimpeded visibility and absence of electrode structure in positions wherein its glow would distract attention from the words or the like It is still another object to provide rugged and otherwise satisfactory spacing and supporting arrangements for the electrodes.

It is a general object to provide an improved device of the character above described.

Other and allied objects will more fully appear from the following description and appended claims.

In the description reference is had to the accompanying drawing, of which

Figure 1 is a view generally elevational but partly in longitudinal vertical section, of a discharge device and system according to my invention;

Figure 2*a* is a transverse vertical cross-sectional view taken along the line 2*a*—2*a* of Figure 1;

Figure 2*b* is a perspective view of the central spacing member of the device of Figure 1;

Figure 3 is a cross-sectional view taken along line 3—3 of Figure 2*a*;

Figures 4*a* and 4*b* are detail elevational views of two alternative forms of spacing members for the electrodes;

Figure 5 is a partial elevational view of an alternative electrode arrangement, and Figure 6 is a partial elevational and partly schematic view of a device and system illustrating still further alternative electrode arrangements, and an associated circuit for causing intermittence of glow-light about some of the indicia.

It will be understood that throughout the specification the term "gaseous" has been employed broadly as the adjective appropriate to one or more gases and/or one or more vapors, the term "gas" to denote one or more gases, and the term "vapor" to denote one or more vapors.

The various features of my invention, with their functions and advantages, are best described after an initial brief description of the general structure of a typical discharge device in which they are co-operatively employed; such a device is illustrated in Figure 1. Herein the numeral 1 designates a transparent envelope or glass tube evacuated of air and containing a filling comprising a monatomic gas component and a second component which for example may be a source of metal vapor. The monatomic gas may desirably be neon with or without the addition of helium up to say 20% of the amount of the neon; but no particular limitation as to the rare gas is intended. As hereinafter appears, the rare gas component preferably has a substantial pressure—e. g., 15 to 35 mm. Hg and preferably more than 18 mm. Hg. The second component of the filling may be provided by a small quantity of mercury, or of mercury with a small percentage of alkali and/or alkaline earth metal, and has been designated in Figure 1 as 31. It will be understood that while the source 31 may cling to the wall of the envelope 1 when cold, it is adapted to vaporize to a degree depending on the temperature of the device, and to develop a vapor pressure independently of the gas pressure abovementioned.

Sealed in the respective ends of the envelope are the stems 2 and 3, respectively provided with the lead-in wires 2*b* and 3*b*, to which respectively are connected the electrode systems 4 and 5 hereinafter described. The lead-in wires are externally connected to the terminals 9 of a voltage source 9*a*, which may be either alternating or direct, through appropriate current limiting means; such means may comprise one or more resistances. Thus in series with the lead-in wire 2b has been schematically shown resistance 8a, while in series with lead-in wire 3b there has been structurally illustrated the resistance 8b; the structure, which has been found desirable, is hereinafter described. Also sealed in the respective stems 2 and 3 are the respective wires 32 and 33; these, however, are supporting wires only, and need not be extended or connected to exteriorly of the seal or envelope.

The electrode system 4 comprises a straight wire 4b welded or otherwise connected at its left extremity to the lead-in wire 2b, and extending longitudinally of the envelope 1 near its wall; letters or other indicia 4c disposed generally so that their plane includes the wire 4b, and extending from near that wire substantially diametrically of the tubular envelope; and short wires 4a welded both to the wire 4b and to the individual letters 4c, and serving to support the latter. The electrode system 5 comprises a straight wire 5b welded or otherwise connected at its right extremity to the lead-in wire 3b, and extending longitudinally of the envelope 1 near its wall and in slight spaced relation to the wire 4b; both wires 5b and 4b may extend substantially the entire length of the envelope, parallel to each other and preferably jointly lying in a plane at right angles to that of the letters 4c. While it may be either in front or behind, the wire 5b has been shown, by way of example only, in front of the latter plane—i. e., spaced therefrom in the direction from which the letters are viewed. For mechanical support of the right extremity of the wire 4b and of the left extremity of wire 5b, these respective extremities may be welded or otherwise secured to the supporting wires 33 and 32, abovementioned. It will be understood that in a view of the device taken precisely normal to the plane of the letters or indicia 4c the wires 4b and 5b would merge into one, as would likewise the points of passage into each seal of the respective two wires (e. g., 2h and 32); for most complete illustration Figure 1 has been taken from a direction slightly displaced from the normal, as indicated by the arrow in Figure 2a.

The primary function of the device is to produce about the letters or other indicia 4c a cathodic glow-light close to the electrode surface so that the surface proper appears to glow. The wires 4a being short, and the wire 4b being preferably disposed slightly underneath the letters or indicia 4c in such a manner as to form an underlining therefor, it is considered permissible that these wires too be surrounded by glow-light. Particularly when the device is operated on alternating current, a glow-light will be produced about the opposite electrode system—e. g., wire 5b; one reason for the positioning of this wire as shown is to avoid its glow distracting attention from the glowing letters or indicia, its glow then simply tending to merge with the letter-underlining glow about the wire 4b. Thus I have so arranged the electrodes that the glow thereabout comprises the desired glow together with entirely permissible glow—so avoiding the trouble of covering portions of the electrodes with glass or other refractory material to prevent their glowing. There will be appreciated, however, the definite undesirability of the production of material glow or other light in the space generally within the envelope—i. e., positive column light—as such light seriously detracts from the prominence of the desired glow-light about the letters.

Insofar as I am aware, a device of this general character—well adapted for example to advertising and display purposes—has never before been produced to operate with useful commercial life and uniform glow-light intensity on the various letter or indicia surfaces, or otherwise in a satisfactory manner and with commercial supply voltages of 220 volts and less. The requirements for a commercially satisfactory device are many, and must of course be satisfied jointly in the single product; among them may be mentioned (a) the minimization of positive column light, both absolutely and relatively to cathode glow-light, abovementioned; (b) the minimization of the required voltage drop across the system, so that it may properly operate on commercially available voltages; (c) the maintenance of even light distribution during operation both between different portions of the same letter and between the several letters; (d) the minimization of electrode disintegration, during initial manufacture and during after-operation, in order to conserve electrode life and to minimize envelope wall discoloration; and (e) the arrangement of electrodes and their supporting and spacing means within the device to insure proper visibility of the letters or indicia, freedom from glow in distracting positions, mechanical ruggedness and other desirable characteristics, without impairing the functioning or life of the device. The various features of my invention co-operate to satisfy jointly these and other requirements as herein becomes apparent.

I may first consider the general arrangement of, and the operating gaseous atmosphere in, my device. Properly to explain their functions and advantages I first call attention to certain factors ordinarily contributing to the creation of ionic losses, of potential gradient, and of light in a positive column—i. e., constriction of the discharge column by the walls, low atomic weight of the gaseous atmosphere active in the positive column, and high pressure and density of that atmosphere.

In my device I make negligible the constriction of the positive column by the walls. This I am able to do, while spreading the electrodes well throughout the envelope interior and thus avoiding wastefully large envelopes, by the described generally parallel arrangement of the two electrodes, resulting in the positive column path being transverse rather than longitudinal of the elongated envelope. As is illustrated in Figure 1, the maximum positive column path length (or longest of the most direct paths to the electrode system 5 from points on the electrode system 4) is shorter than the transverse envelope dimension (e. g., diameter), while the width of the positive column path is preferably many times that dimension (e. g., is substantially the length of the envelope). Obviously as to this short, wide positive column path the walls are substantially removed. So I provide a first significant factor in the minimization of positive column light (as well as of ionic losses and potential gradient). It will also be noted that for minimization of these losses it would be desirable that I employ a gaseous atmosphere of high atomic weight and low pressure or density. But as a generality this is deleterious to the desired brilliant cathodic glow-light about the electrodes, for the following reasons:

It is of course necessary that I pass at least sufficient current to the cathode surface to cause it to be fully surrounded by glow at normal cathode fall; at the same time it is undesirable that I pass sufficient current to create an abnormal fall to any marked degree, because of the detrimental effect thereof on electrode life. The normal cathode fall is known to increase with decreasing atomic weight of the here active gaseous atmosphere (as well as with increasing work function of the cathode); while the value of current appropriate to complete glow coverage of the cathode with substantially normal cathode fall increases with increasing gaseous density. Thus, to maintain brilliant glow-light about the electrodes, it is desirable that I employ a gaseous atmosphere of relatively small atomic weight and of substantial pressure or density.

I solve the problem created by this repugnance of requirements between positive column light and electrode glow-light by employing such a gaseous envelope filling that under operating conditions the actively effective gaseous atmosphere close to the cathode is of high density and preferably low atomic weight, while the actively effective gaseous atmosphere in the positive column is of low density and preferably of relatively higher atomic weight. This filling consists of a rare gas component of approximately the desired spectrum (for example neon) at a substantial pressure; and a gaseous component of lower ionization potential, and preferably of greater atomic weight, at a much lower pressure. Since mercury vapor in suitably limited amount nicely meets the specification for the second of these components, I have preferred to employ it, and shall hereinafter frequently refer to such second component simply as the "vapor" or the "mercury vapor", without intending thereby any undue limitation. It will be understood that I have just referred to the vapor pressure in the sense of the pressure during normal operation. The desired limitation of pressure may be effected by limiting the amount of vaporizable mercury inserted in the device.

Because of its lower ionization potential the vapor will be preferredly ionized in any space portion so long as a sufficient amount of the vapor there exists to enable the faster electrons, by ionizing the vapor, to develop ions at the required rate for that space portion. I preferably employ only sufficient or slightly more than sufficient, vapor pressure and density to meet the relatively low requirements for ionizable atmosphere in the very wide path of the positive column, so that only or substantially only vapor will be there ionized, and the effective gaseous atmosphere of the positive column may be considered a vapor one. The requirement for ionizable atmosphere close to the cathode, however, is relatively high and accordingly the limited density vapor can at best supply only a small fraction of that ionization which produces the cathodic glow light; this ionization is therefore almost entirely of the rare gas, and the cathode glow-light characteristics are accordingly principally determined by that component. Because, however, of the relatively high average electronic velocity in producing the cathode glow-light this light is somewhat more predominant in higher frequency lines of the rare gas than is the positive column light of a similar rare gas in a tube of the conventional neon sign type.

I obtain then, assuming the use of neon as a rare gas, a striking pinkish-red glow-light about the cathode, including the indicia 4c, and an ordinarily practically unobservable background, or positive column. It is to be understood that this desirable result springs most essentially from the joint factors of short, wide discharge path with removed walls, and of extremely low vapor pressure. I employ a vapor pressure usually of the order of or less than .001 mm. Hg, and at the most of only a few thousandths mm. Hg, so that the ratio of gas to vapor pressure is maintained well in excess of 1,000 times, and in typical cases in excess of 10,000 times.

Thus my device well meets the requirement (*a*) above; at the same time the very low positive column potential gradient and total drop resulting from the actively effective low density vapor atmosphere is a large contribution to the meeting of requirement (*b*).

I have thus far described the desired cathode glow-light, and the generally undesired positive column light, in my device. There will also, of course, be at least a tendency toward anode glow-light—in general of the normal color corresponding to the rare gas but ordinarily unobservably faint (as a result among other things of lower electronic velocities and much lower fall than in the case of the cathode). Accordingly when my device is operated on direct current, the electrode system 4 is maintained permanently cathodic and the electrode system 5 permanently anodic. When the device is operated on alternating current, however, the glow-lights appear essentially similar on each electrode system, each such light dynamically comprising an alternation of the prominent cathode glow-light and relatively faint or unobservable anode glow-light.

With whichever current be employed, I prefer of course so to adjust the value of the resistances 8a and 8b as to operate the device with substantially normal cathode fall. I here point out that compliance with requirement (*b*) for low total voltage drop across the system, and with requirement (*d*), at least insofar as it relates to minimization of electrode disintegration during normal operation, is facilitated by maintaining the normal cathode fall at a moderate value (though of course not excessively low, otherwise the brilliance of the cathode glow-light will be unduly sacrificed). And while the presence of the vapor in my gaseous filling does not seem strikingly to affect the color of the cathode glow-light, I have found that it does have some significant action in moderating the normal cathode fall.

It is very desirable, for starting facilitation and for the obtainment of long glow periods each half cycle without impairment of electrode life, to have portions of the respectively opposite electrodes mutually very near each other—in the order of a few mm. apart—as the wire 4b and the bottom portions of the letters 4c preferably are to the wire 5b. Therefore a device of this character will involve great differences in discharge path length from one electrode to various portions of the other and will, so long as simple rare gas is employed, involve relatively significant potential gradient in the positive column; the positive column drop, as to different portions of the same electrode, will be very different, not merely in ratio but in absolute value. But for uniformity of glow-light development on the electrode the absolute differences in positive column drops should be maintained at a very small fraction of the normal cathode fall, and desirably at a fraction of the anode fall (which might typically in a device of this character be of the order of 12 volts). If this condition be seriously violated there will result uneven glow-light development —or even actual absence of glow-light over large portions of the letters—unless there be employed abnormally high current through the device and a significantly abnormal cathode fall therein. The high current density per unit electrode surface, which goes hand in hand with high total current and abnormal cathode fall, leads to rapid electrode disintegration and bad impairment of electrode life and wall discoloration, besides requiring higher supply voltages. By the introduction of just sufficient vapor density to render the positive column discharge a low pressure vapor discharge, I not only obtain the advantages above discussed in connection with positive column light and voltage drop minimization, but also vastly reduce the difference in positive column drop as to different electrode portions. In view of the width and shortness of even the longest discharge path involved, the absolute value of the maximum difference in positive column drop is rendered almost negligible, and it becomes possible to obtain excellent light uniformity without involving appreciably abnormal cathode fall, or increased current and voltage drop across the system. Thus I meet requirement (c) without impairing compliance with requirements (b) and (d).

The last requirement in a device of the character under consideration is an extremely important one, not merely in respect of electrode life, but even more in respect of cleanliness of the envelope walls, which at almost all points are near enough to the electrodes to receive serious blackening therefrom should the latter either during normal operation or during original manufacture seriously disintegrate. It is obviously important to minimize this disintegration not only in normal use but in original manufacture and preparation for use. While I may employ in my device a conventional electrode material of pure iron or of iron alloyed with a few per cent of nickel, these tend to require overloading with considerably abnormal cathode fall, thereby causing excessive disintegration, in these initial stages. I have found, however, that by employing for the electrode material an alloy of pure iron with a higher percentage than usual of nickel—say between 10% and 35% and preferably in the range from 15% to 20%—the alloy permissibly containing a few per cent of some alloying agent such as manganese and having preferably been prepared or melted in vacuum and drawn or otherwise formed into wire or the like within a reasonable time thereafter, and by using mercury ions to bombard the electrode surface, I am able after a short bombardment to cause the electrode surface to glow evenly without having caused appreciable blackening, and thereby to put the device in condition for several thousand hours of operation free of troublesome effects.

Preferably I perform this bombardment in the following manner: After the device has been structurally completed excepting for the introduction of the filling and final sealing off from outside air, I pump the device to a high vacuum, and introduce a little rare gas to permit starting of a discharge, together with an appreciable quantity of mercury; I then apply voltage to the system to start some discharge, preferably having warmed the device by exposure (e. g., in a suitable oven) to an ambient temperature of 300 to 350 degrees C. to cause high vapor pressure; thus mercury ions are formed and are the principally active ions in the electrode bombardment. Somewhat more than normal voltage is used in this procedure, in view of the now high vapor pressure. This bombardment may be permitted to continue for a while to insure substantial completion of effect on the electrode surface, above mentioned. Finally, the bombardment is stopped; the device is cleared of rare gas, oxygen and other occluded gases, and of mercury; then before sealing off there is inserted the normal rare gas filling component and mercury for normal vaporization (or sufficient of the latter may be left in at the conclusion of the clearing operation). It is to be understood that the mercury vapor in the normal filling co-operates with the alloy electrodes to effect in the first several hours of normal operation a final completion of the electrode surface preparation which the special bombardment above-mentioned may not utterly complete.

It appears that the alloy surface though sufficiently oxidized to prevent initially a proper glow discharge, will under normal mercury ion bombardment rapidly change the structure of its defective sections and come quickly to a condition of even glow. The surface of the electrode material contains a large amount of nickel, with which the mercury vapor forms an amalgam having a cathode fall distinctly lower than that of iron and of course much lower than that of oxidized iron. This amalgam seems to form in at least small particles closely spaced over the whole oxidized surface, so that glow rapidly appears over the entire electrode area; good distribution is thus obtained almost immediately, and without the necessity for abnormally high cathode fall. In the course of a short time the continued bombardment with substantially normal cathode fall will remove the oxygen or oxidized iron of the surface molecular layer, leaving the pure iron and nickel: and such disintegration of the latter as occurs has not been found at all of serious magnitude.

Too much nickel in the alloy would undoubtedly raise the disintegration to a serious value, while not enough will prevent the quick spread of the glow over the whole electrode area—probably by rendering too great the average separation of the amalgam particles. Of course, at least part of the nickel in the alloy might be replaced with some other metal adapted to form an amalgam with the mercury. It may further be mentioned that in cases wherein exceptionally low cathode fall is desired for purposes of facilitating starting with very low voltages (although in general not otherwise) it may be desirable to use one of the alkaline earth metals, such as barium, as the amalgam-forming metal with which to replace the nickel to the extent of 1 or 2% of the total alloy.

I have thus shown the more important practices in my invention which in co-operation cause the device to meet the requirements (*a*), (*b*), (*c*) and (*d*) hereinabove mentioned. I shall now proceed to a description of the further features of my invention and of the illustrated embodiments, resuming reference to the figures.

As hereinabove set forth, each of the wires 4b and 5b is terminally secured at its one end to one of the lead-in wires (2b and 3b), and at its other end to one of the supporting wires (32 and 33). Preferably the lead-in wire and the supporting wire in each of the stems pass therethrough in a plane substantially normal to the plane of the letters or indicia 4c, or in a plane substantially parallel with the plane containing the two wires 4b and 5b. This arrangement aids in guarding against twisting of the electrode structure, and otherwise in rendering the same rigid. Further rigidness is imparted by the central spacing member 34, preferably of mica or other thin insulating material, which may be formed as a crescent having an outer periphery of about 225 degrees fitting the interior cross-section of the envelope 1; the main body of the crescent is preferably disposed behind the plane of the letters 4c so as to maintain visibility; the wires 4b and 5b pass through and are held in apertures provided in the crescent as hereinafter more particularly described. Still further rigidness is imparted by holding the two wires 4b and 5b in their proper fixed spaced relationship at a plurality of intermediate points, as by a plurality of transverse ceramic spacers, for example of magnesium oxide, aluminum oxide and/or magnesium silicate illustrated as 6 and 7 and further mentioned below. Rigidness of the wire 5b is further aided by welding thereto and parallel therewith reinforcing wires 5a, which may be shorter pieces of wire similar to 5b; these are preferably welded onto the wire 5b along sections which include the points at which it is to pass through one of the positioning members—e. g., 6, 7, 34. The advantage of plurality of shorter pieces over a single long piece is the freedom from permanent twisting tendencies which might be imparted by slight inaccuracies of positioning of a long wire while welding it to the wire 5b.

The provision of the additional wires 5a has the further beneficial effects—particularly significant with A. C. operation—of increasing the surface of the electrode system 5, and of providing the increased-area electrode with effective grooves. (These latter are of course the longitudinal grooves of the top and bottom of the electrode, formed by the convergence of the surfaces of the wires 5b and 5a toward their line of mutual contact.) Both increased surface and grooving of the surface have in turn the effect of many times increasing the current which may be passed to and from the electrode without involving abnormal cathode fall at times when that electrode acts as cathode—thereby permitting sufficient discharge current to illuminate the indicia 4c in their entirety without at the same time overloading the electrode system 5 with seriously abnormal cathode fall.

If not properly arranged, the positioning members placed along the wires 4b and 5b for mechanical reasons (e. g., spacing member 34 and spacers 6 and 7) may render portions of the device inoperative, or at least cause badly impaired life of portions of the electrodes and accompanying wall blackening. The glow, usually starting at one end of, or some one region in, the electrode systems when voltage is first applied across the device, will spread only as far as the first such member and there stop. This stoppage results from the fact that the voltage required to start a discharge is in excess of the normal operating voltage; as discharge is established the voltage across the tube automatically becomes less than the starting voltage; and if the spread of cathode glow-light along immediately adjoining electrode areas (which requires only approximately normal voltage) is interrupted, the already glowing section must develop sufficiently abnormal cathode fall to raise the voltage across the device to the order of the original starting voltage. Under some circumstances—for example, relatively large area of already glowing section—this section cannot develop a sufficiently abnormal cathode fall, and the stoppage of glow travel will persist and only a portion of the device will ever be operative. Under other circumstances the already glowing section will be able to develop the required abnormal cathode fall—but at the expense of serious overloading for a time; this, being a phenomenon which occurs upon each re-starting of the device, cannot be tolerated. To obviate the stoppage in the first place I so form each of the positioning members, or so arrange them in conjunction with the electrode wire passing therethrough, that substantial continuity of exposed active surface along the whole electrode wire is preserved; otherwise expressed, so that there exists along the electrode a fully continuous strip of atmosphere of thickness at least a few times the length of the mean free path of electrons in the gaseous atmosphere. This may be done in either of two manners.

In the first of these manners, illustrated as to the spacers 6 and 7, I provide the positioning member with a hole (6a, 6b) substantially fitting the electrode passing therethrough and therefore providing a good mechanical engagement; but I provide in the member, adjoining the hole over a minor portion of the hole periphery, an aperture (6a', 6b') illustrated in Figure 4*a* as a sectoral one extending outwardly to the periphery of the positioning member. In Figure 4*b* the apertures, again sectoral for example, have been alternatively illustrated as 6a'' and 6b'', each extending for a finite distance inwardly of the positioning member. A similar arrangement has been illustrated in Figures 2*a* and 2*b* in connection with member 34 for the wire 5b, with the welded-wire 5a; adjoining the elliptical hole 34a (which would normally nicely pass the double wire) has been provided along a portion of one side a generally semicircular aperture 34a' (preferably of ½ mm. or more radius) which maintains continuity of exposed surface along each of the two wires 5b and 5a.

Accordingly to the second manner, I provide about the interrupted surface portion of the electrode a bridging member itself capable of glow development—for example a thin wire of iron or preferably of similar material to my preferred electrodes. This has the advantage of permitting a particularly firm holding of the electrode by the positioning member, and has been illustrated as to the electrode wire 4b passing through the central spacing member 34 (Figures 1, 2 and 3, particularly the latter). Thus to the electrode wire at the point of intended passage through member 34 I weld centrally the bridging wire 11. I then slip the member 34, which has been provided with a suitable aperture, into place to surround the weld. I then slip over the wires, and into contact with the two sides of the member 34, ceramic or other insulating buttons or beads 10a and 10b which may be in the form of centrally apertured hemispheres. Finally I bend back each end of the wire 11 and pass the ends in opposite directions through a considerably oversize hole 12 (preferably 1 mm. or larger) provided in the member 34 near the beads, thus bringing the two ends into substantial, though not necessarily perfect, mutual contact. The glow, spreading on the electrode wire 4b on either side of the member 34 to the button on that side, will travel around the portion of the bridging wire 11 exposed on that side, jump to the other portion of the bridging wire, and travel therealong to the wire 4b on the opposite side of the member 34.

Attention may be directed to the end-member arrangements illustrated in Figure 1. These may be similar for the two ends of the device; corresponding numbers have been used for the components at the two ends, excepting that those numbers relating to the left end have been provided with the suffix "*a*" and those relating to the right end with suffix "*b*". In describing these end member arrangements reference is most conveniently had in Figure 1 to the right end of the device, where the illustration is largely in central cross-section. A Bakelite or other insulating cap **41*b*, conveniently a moulded one, is cemented to the end of the envelope 1, where the envelope diameter is reduced for union with the stem, the cap being long enough to surround the stem. At the bottom of the cap—i. e., at its extremity disposed toward the center of the envelope—is conveniently provided the flange 41*b'*; centrally of the top of the cap is conveniently provided the recessed, externally-threaded boss 41*b''*. Around the main body of the cap is wound the resistance 8*b* above-mentioned, the wire being conveniently lightly covered with cement after winding. At the extremities of the resistance may be provided the lugs 42*b* and 43*b*. The lead-in wire at the end of the device is connected to the lug 42*b*, while the lug 43*b* is connected to a metallic button 44*b* centrally inset into the recessed boss 41*b''*. To the button 44*b* is also soldered the insulated wire 45*b* which connects this end of the device with the terminals 9. Freely surrounding the wire 45*b* is the shell assembly 46*b* which comprises the threaded bushing 46*b'* held in the shell proper 46*b''*, which may be of any convenient material such as metal. The shell may be internally provided with the recessed female-threaded boss 46*b'''* adapted to fit the threaded boss 41*b''*; after soldering of wire 45*b* to button 44*b*, the shell assembly may be slipped along the wire toward the device and secured thereto by screwing onto the boss 41*b''*. The threaded bushing 46*b'* may extend externally of the shell 46*b''*, may be slipped through a hole provided in any convenient bracket or support 47*b*, and secured therein by tightening on the bushing of a nut 48*b***. Thus the device may be supported at its extremities.

The advantage of arranging the resistances **8*a* and 8*b* in the manner just described; is that they maintain the end portions of the envelope, which are removed from the positive column, at least at the temperature of the more central envelope portions. This is desirable in the case of operation in abnormally low ambient temperatures because the coolest envelope portion will in general determine in normal operation the amount of mercury vaporized and hence the vapor pressure; and, while only a very small pressure is needed, too little might then be developed if the end envelope portions were not warmed by external means. Ventilating holes such as 49*b* may be provided in the shell proper 46*b''*** to obviate excessive heating of the resistance unit therewithin.

It is very desirable to maintain the spacing between the parallel wires **4*b* and 5*b* at a relatively low value, at least compared with the envelope diameter—with a device of the general characteristics herein set forth as typical, at a value of 3 to 5 mm. for example. This is to insure easy starting of the discharge each time the system is connected with the supply voltage, and, in alternating current operation, early starting in each half-cycle with attendant good light efficiency and minimization of cyclic flicker. While I ordinarily prefer the electrode construction which I have already shown and described, it is feasible with alternating current operation, so long as the desirable close spacing of the wires 4*b* and 5*b* is retained, to mount the letters or indicia 4*c* alternately to the two wires 4*b* and 5*b* as shown by the separate letters "A" and "B" in Figure 5, and/or to provide such letters as may be desired in double formation, as shown by the right-hand letter "A" in Figure 5. It is further possible, as shown by the letters and portions 4*c''* in Figure 6 hereinafter more particularly described, to mount letters or indicia to a longitudinal wire (e. g., 51) which is spaced widely and not closely from the electrode of opposite polarity (e. g., 5*b***)—but in this case letters forming a portion of the one electrode system must in places approach the other electrode system in the close spacing above-mentioned; preferably the places of such approach will be at least as near to each other as the diameter of the envelope. And in any event the longest path which must be traversed by any section of the discharge is preferably maintained smaller than the diameter of the envelope in the interest of uniformity of glow over the letter portions.

Figure 6 is particularly intended to show an arrangement wherein letters and/or portions thereof (**4*c''*) are at any desired rate caused to flash on and off, other letters (4*c*) being provided if desired for continuous illumination. The arrangement is readily carried out by providing the wires 4*b* and 5*b* and mounting such letters as are to glow continuously on the wire 4*b* as before, and by additionally providing a longitudinal wire such as 51—for example above the letters—and mounting thereto such letters as are intended to glow intermittently (the spacing cautions above-mentioned being desirably observed). The lead-in wires 2*b* and 3*b* for the respective wires 4*b* and 5*b* are externally connected through the respective resistances 8*a* and 8*b* across the voltage supply—which in this case by way of example has been shown as the secondary 54'' of an auto-transformer 54, of which the primary 54' is connected to the line terminals 9'. The lead-in wire 52 for the added wire 51 is shown connected through a resistance 53—for example, of similar ohmic value to resistance 8*b*—to the contacts 55' of a thermostatic switch 55, and therethrough to the same side of the voltage supply as the wire 5*b*. The resistance element 55'' of the switch 55 is connected in some branch of the external circuit wherein the current flow will be affected by the glow or non-glow of the letters 4*c''*, as in series with the contacts 55' themselves. The system is arranged for automatic alternation of switch openings and closings; as illustrated, the contacts will be biased to closed position and will therefore initially produce a glow of letters 4*c''* and heating of element 55'', to which the contacts will respond by opening and thus cooling the element 55''**, whereupon the contacts will again close, and so on.

From Figure 6 there has been omitted, only however in the interest of simplification, any showing of the envelope 1 or of the support of the wires **4*b* and 5*b* (and 51) at their non-lead-in extremities by such supporting wires as 32 and 33** of Figure 1. Subject to this qualification, the structural portion of Figure 6 indicates in general the mechanical method which I prefer to employ in constructing a device according to my invention: In other words; the electrodes wires are connected to the appropriate wires already sealed in the stems 2 and 3, as by welding, to make a unit of stems and electrodes. This unit is slipped into the envelope 1, which is initially of reduced diameter at one end only, and the stem at such end is sealed to the envelope. Finally, utilizing an appropriately high amount of heat, the other or full-diameter end of the envelope is drawn inwardly to meet the other stem, and thereto sealed.

In concluding the description, I may mention some typical parameters, in addition to such as have already been mentioned, of devices constructed in accordance with my invention—though this I do in an illustrative rather than a limitative spirit. The envelope has been of glass tubing of about 6 cm. diameter, 65 to 70 cm. long. The wires used for electrodes have been of such an alloy as abovementioned, about 1½ mm. in diameter, the wires 4*b* and 5*b* being spaced apart about 3 mm. and the letters being formed to a height of about 4½ cm. The gas component of the filling has been a mixture of 85% neon and 15% helium, at a pressure between 18 and 35 mm. Hg, and a quantity of mercury of size not greater than a pin-head has provided the vapor component of the filling. The resistances 8*a* and 8*b* have each been of the order of 50 ohms. There has been applied across the system as illustrated in Figure 1 a voltage of about 160 volts A. C. producing an R. M. S. discharge current of about 120 to 150 ma. (which may be seen from the electrode dimensioning set forth above to represent a current density on the electrode system 4 well in excess of .5 ma., and more specifically of the order of 1.5 to 2.5 ma., per square centimeter), or a voltage of about 125 volts D. C. The power consumption has been 20 to 30 watts (principally of course in resistances 8*a* and 8*b*), and the device has operated with materially less than a 20 degree centigrade rise about ambient temperature.

It will be understood that the value of resistances 8*a* and 8*b*, and of the operating current, will depend materially on the area of the electrodes—particularly of the indicia 4*c*, which may vary between devices otherwise similar. It is therefore convenient, in finishing the manufacture of one of these devices, to equip it temporarily with arbitrarily low-valued end resistances (or with none, but otherwise maintaining the ends as warm as the central portions) and by test to determine the total external resistance appropriate to substantially the minimum current which produces good glow all over the indicia 4*c*. Permanent resistances 8*a* and 8*b* may then be prepared and installed, having a total resistance equal to that determined experimentally as abovementioned.

It will be appreciated of course that while I have shown and described my invention in terms of preferred embodiments thereor, I do intend not to be limited by all the details of those embodiments, but rather to express the scope of my invention in the appended claims, as broadly as the state of the art will permit.

I claim:

1. In a gaseous discharge system, the combination with an elongated envelope, a filling therefor including a rare gas component at pressure at least of the order of 15 mm. Hg, and two electrode systems each extending longitudinally substantially throughout said envelope, various portions of one system having widely different direct separations from the other system: of means for maintaining between said electrode systems a discharge covering said systems at substantially normal cathode fall; and a further component in said filling having a lower ionization potential than said gas, at pressure limited to less than sufficient for appreciable luminous excitation of said further component but sufficient to restrict luminous excitation of said gas to the immediate vicinity of said electrodes.

2. In a gaseous discharge system, the combination with an elongated envelope, a filling therefor including a rare gas component at pressure at least of the order of 15 mm. Hg, and two electrode systems each extending longitudinally substantially throughout said envelope, various portions of one system having widely different direct separations from the other system: of means for maintaining between said electrode systems a discharge covering said systems at substantially normal cathode fall; and a further component in said filling comprising mercury vapor at pressure limited to at most a few thousandths of one mm. Hg.

3. In a gaseous discharge system, the combination with an elongated envelope, a filling therefor including a rare gas component at pressure at least of the order of 15 mm. Hg, and two electrode systems each extending longitudinally substantially throughout said envelope, various portions of one system having widely different direct separations from the other system: of means for maintaining between said electrode systems a discharge covering said systems at substantially normal cathode fall; and a further component in said filling comprising a metal vapor at pressure limited to the order of the minimum required to render the positive column portion of said discharge substantially a pure vapor discharge.

4. In a gaseous discharge system, the combination with an elongated envelope, a filling therefor including a rare gas component at pressure at least of the order of 15 mm. Hg, and two electrode systems each extending longitudinally substantially throughout said envelope, various portions of one system having widely different direct separations from the other system: of means for maintaining between said electrode systems a discharge covering said systems at substantially normal cathode fall; and means, comprising a further envelope filling of lower ionization potential than said gas limited to relatively minute pressure, for maintaining between said electrodes a substantially dark positive column.

5. In a gaseous discharge system, the combination with an elongated envelope and a filling therefor including a rare gas component at a pressure at least of the order of 15 mm. Hg: of electrode means including two mutually insulated straight wires extending in close spaced relationship to each other and to the wall of said envelope longitudinally through said envelope, and further including a plurality of indicia extending from one of said wires for a major fraction of the envelope diameter substantially in a plane containing the envelope axis; means for maintaining between said electrode means an alternating discharge covering said electrode means at substantially normal cathode fall; and a further component in said filling comprising mercury vapor at pressure limited to at most a few thousandths of one mm. Hg.

6. In a gaseous discharge system: an elongated envelope; a filling therefor including a rare gas component; two electrode systems each extending longitudinally substantially throughout said envelope; means for maintaining between said electrode systems a normal discharge covering said systems at substantially normal cathode fall; and mercury within said envelope in sufficiently small quantity to limit the mercury vapor pressure during said normal discharge to a maximum of a few thousandths of one mm. Hg, said electrodes being formed and having a surface of an alloy consisting principally of iron but containing between 10 and 35 per cent of other metal of the iron group with which mercury amalgamates.

7. In the maintenance of a discharge, in an atmosphere including rare gas at a pressure at least of the order of 15 mm. Hg across a wide discharge path of widely differing short lengths in its several side-by-side portions, the method of creating brilliant glow throughout the entire terminal portions only of said path while minimizing differences in the potentials across the several path portions, which comprises maintaining said discharge at a terminal density sufficient for discharge at substantially normal cathode fall to the entire said terminal portions, and maintaining in said atmosphere mercury vapor at a pressure at most of the order of a few thousandths of one mm. Hg.

8. A gaseous discharge device comprising an elongated envelope; a gaseous atmosphere therewithin comprising rare gas at a pressure at least of the order of 15 mm. Hg; electrode means including two mutually insulated straight wires extending in mutually parallel and closely spaced relationship longitudinally through said envelope, and further including a plurality of indicia secured to at least one of said wires at intermediate points therealong; and a minute source of mercury vapor within said envelope.

9. A gaseous discharge device comprising an elongated envelope; a gaseous atmosphere therewithin comprising rare gas consisting principally of neon, at a pressure at least of the order of 15 mm. Hg; electrode means including two mutually insulated straight wires extending in close spaced relationship to each other and to the wall of said envelope longitudinally through said envelope, and further including a plurality of indicia extending from one of said wires for a major fraction of the envelope diameter substantially in a plane containing the envelope axis; and a minute source of mercury vapor within said envelope.

10. A gaseous discharge device comprising an elongated envelope; a gaseous atmosphere therewithin comprising rare gas at a pressure at least of the order of 15 mm. Hg; a pair of electrodes extending longitudinally through said envelope, at least one of said electrodes including an intermediately supported member having a continuous longitudinal exposure to said atmosphere, and including a plurality of indicia secured to said member; and a minute source of mercury vapor within said envelope.

11. A gaseous discharge device comprising an elongated envelope; a gaseous atmosphere therewithin; and a pair of electrodes extending longitudinally therethrough, at least one of said electrodes including an intermediately supported member having a continuous longitudinal exposure to said atmosphere, and including a plurality of indicia secured to said member.

12. In a gaseous discharge device including an elongated envelope and a gaseous atmosphere therewithin: a longitudinally extending electrode; and insulating electrode-positioning means provided with a hole engaging said electrode intermediately of the extremities thereof, and further provided with an aperture adjoining said hole over a minor fraction of the hole periphery.

13. In a gaseous discharge device including an elongated envelope and a gaseous atmosphere therewithin: a pair of longitudinally extending electrodes; electrode-positioning means through which at least one of said electrodes passes and which closely surrounds said electrode; and bridging electrode means extending around the intersection of said positioning means with said electrode.

14. In a gaseous discharge device including an elongated envelope and a gaseous atmosphere therewithin: a pair of longitudinally extending electrodes of small cross-section, and indicia secured to a first of said electrodes, the other of said electrodes having appreciably smaller surface than the first but being provided with longitudinal grooves whereby to increase its operating current density at normal cathode fall.

15. A gaseous discharge device comprising an elongated envelope, a gaseous atmosphere therewithin, and electrode means including two mutually insulated straight wires extending in mutually parallel and closely spaced relationship longitudinally substantially throughout said envelope, and further including indicia secured to at least one of said wires at intermediate points therealong.

16. A gaseous discharge device comprising an elongated envelope, a gaseous atmosphere therewithin; electrode means including two mutually insulated straight wires extending in mutually parallel and closely spaced relationship longitudinally of said envelope and indicia secured to at least one of said wires at intermediate points therealong and disposed substantially in a plane passing longitudinally through said envelope, said wires being relatively near to the wall of said envelope.

17. The combination according to claim 16 wherein said wires lie in a plane substantially normal to said indicia plane.

18. The combination according to claim 16, further including spacing means engaging both said wires in at least one intermediate region therealong, and supporting and lead-in wire means secured to the extremities of said wires and passing outwardly of the extremities of said envelope at least approximately in a plane parallel with the plane containing said wires.

19. In combination in a gaseous discharge device: an elongated envelope containing a filling of rare gas and metal vapor and a plurality of electrodes, and having inwardly extending stems at its extremities; cap members surrounding the envelope extremities; and resistances wound about said cap members, each of said resistances being connected in series with a said electrode whereby to maintain the extremities of said envelope at higher temperatures than the intermediate envelope portions.

20. In combination in a gaseous discharge device: an elongated envelope and electrodes therewithin; at least one cap member secured to an extremity of said envelope and having externally a threaded portion; a resistance wound about said cap member and terminally connected with one of said electrodes; and a shell member having internally a threaded portion removably engaging said threaded cap portion and substantially enclosing said resistance.

HANS WOJTKOWIAK.